United States Patent

Drei et al.

[19]

[11] Patent Number: 6,012,893
[45] Date of Patent: Jan. 11, 2000

[54] DEVICE FOR TRANSFERRING A BAR FROM A SUPPORTING SURFACE INTO THE GUIDING CHANNEL OF A BAR FEEDER

[75] Inventors: Andrea Drei; Enrico Nenni, both of Faenza, Italy

[73] Assignee: IEMCA Guiliani Macchine Italia S.p.A., Faenza, Italy

[21] Appl. No.: 09/124,748

[22] Filed: Jul. 29, 1998

[30] Foreign Application Priority Data

Jun. 9, 1997 [IT] Italy ................................ BO97A0548

[51] Int. Cl.$^7$ ................................................ B65G 29/020
[52] U.S. Cl. ...................................... 414/746.4; 414/746.2
[58] Field of Search ...................... 198/468.6; 414/746.4, 414/746.2, 746.1

[56] References Cited

U.S. PATENT DOCUMENTS

| | | |
|---|---|---|
| 2,573,848 | 11/1951 | Kirchner . |
| 3,103,939 | 9/1963 | Haugland ......................... 414/746.4 X |
| 3,118,546 | 1/1964 | McConnell et al. . |
| 3,306,472 | 2/1967 | Blanz .................................. 414/746.4 |
| 3,419,159 | 12/1968 | Schaller et al. . |
| 3,446,367 | 5/1969 | Anderson ......................... 414/746.4 X |
| 3,757,960 | 9/1973 | Hill et al. .............................. 414/746.4 |
| 4,212,584 | 7/1980 | Johnson ................................ 414/746.4 |

FOREIGN PATENT DOCUMENTS

| | | | |
|---|---|---|---|
| 3338281 | 5/1985 | Germany . | |
| 3424571 | 2/1986 | Germany . | |
| 1017626 | 5/1983 | U.S.S.R. .............................. 414/746.4 |
| 1414558 | 8/1988 | U.S.S.R. .............................. 414/746.4 |

*Primary Examiner*—Janice L. Krizek
*Attorney, Agent, or Firm*—Guido Modiano; Albert Josif

[57] ABSTRACT

A device for transferring a bar from an inclined supporting surface into the guiding channel of a bar feeder, comprising multiple elements which are articulated below the supporting surface, each element being composed of a bar abutment and follower lever, which is actuated so as to oscillate between a position in which it abuts against the bar arriving from the chute and a position for depositing the bar in the guiding channel, and of a bar supporting lever, which is operatively associated with the abutment lever and forms, together with the lever, a slot for receiving the bar which arrives from the supporting surface; the supporting lever is operatively associated with the abutment lever so that it oscillates in a manner in which it surpasses the abutment lever during rotation from the bar receiving position to the position for depositing the bar in the guiding channel.

12 Claims, 5 Drawing Sheets

DEVICE FOR TRANSFERRING A BAR FROM A SUPPORTING SURFACE INTO THE GUIDING CHANNEL OF A BAR FEEDER

BACKGROUND OF THE INVENTION

The present invention relates to a device for transferring a bar from a supporting surface into the guiding channel of a bar feeder.

It is known that in some kinds of bar feeders the bar to be machined is inserted in the guiding channel of the feeder by making it slide by gravity along an inclined supporting surface adjacent to the guiding channel.

The mechanical stress to which the involved structural parts are subjected is particularly intense in the case of large-diameter bars; accordingly, breakages and permanent deformations can occur which can compromise the operation of the feeder.

Furthermore, in the case of small-diameter bars the bar may enter the channel less than perfectly and therefore the advancement of said bar may be compromised.

SUMMARY OF THE INVENTION

The aim of the present invention is to provide a device which allows to follow the bar during its transfer into the guiding channel, so as to avoid impacts which can endanger the integrity of the feeder and so as to facilitate correct positioning of the bar in the guiding channel.

This aim is achieved by a device for transferring a bar from an inclined supporting surface into the guiding channel of a bar feeder, characterized in that it comprises a plurality of elements articulated below said supporting surface, each element being composed of a bar abutment and follower lever, which is actuated so as to oscillate between a position in which it abuts against the bar arriving from said chute and a position for depositing the bar in the guiding channel, and of a bar supporting lever, which is operatively associated with said abutment lever and forms, together with said lever, a slot for receiving said bar which arrives from said supporting surface, said supporting lever being operatively associated with said abutment lever for oscillating so as to surpass said abutment lever during rotation from the bar receiving position to the position for depositing said bar in the guiding channel.

BRIEF DESCRIPTION OF THE DRAWINGS

Further characteristics of the device will become apparent from the following description of a preferred embodiment, illustrated only by way of non-limitative example in the accompanying drawings, wherein.

DESCRIPTION OF THE PREFERRED EMBODIMENTS

Figure 1:
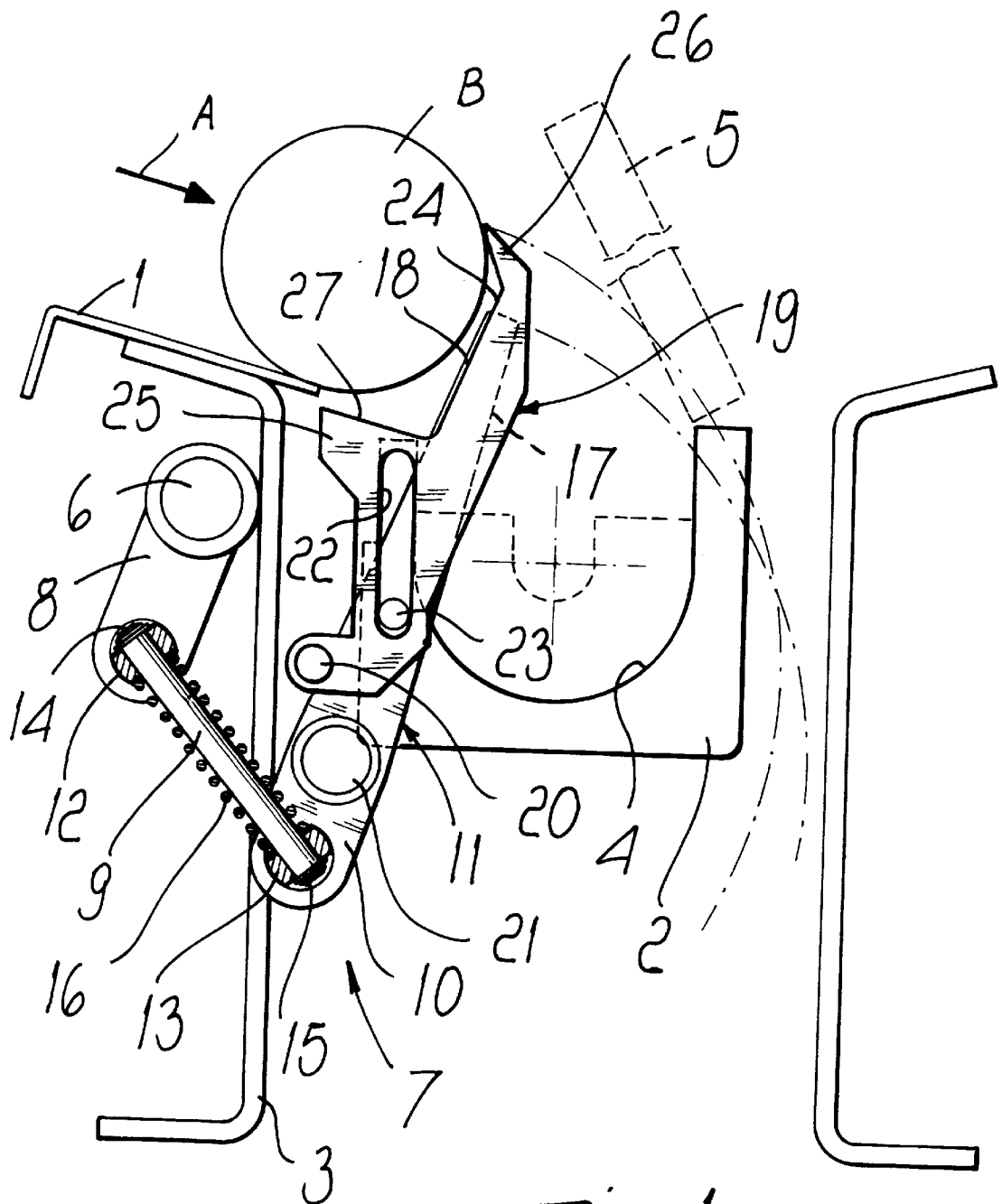
FIG. 1 is a view of the device for transferring a large-diameter bar.
Figure 3:
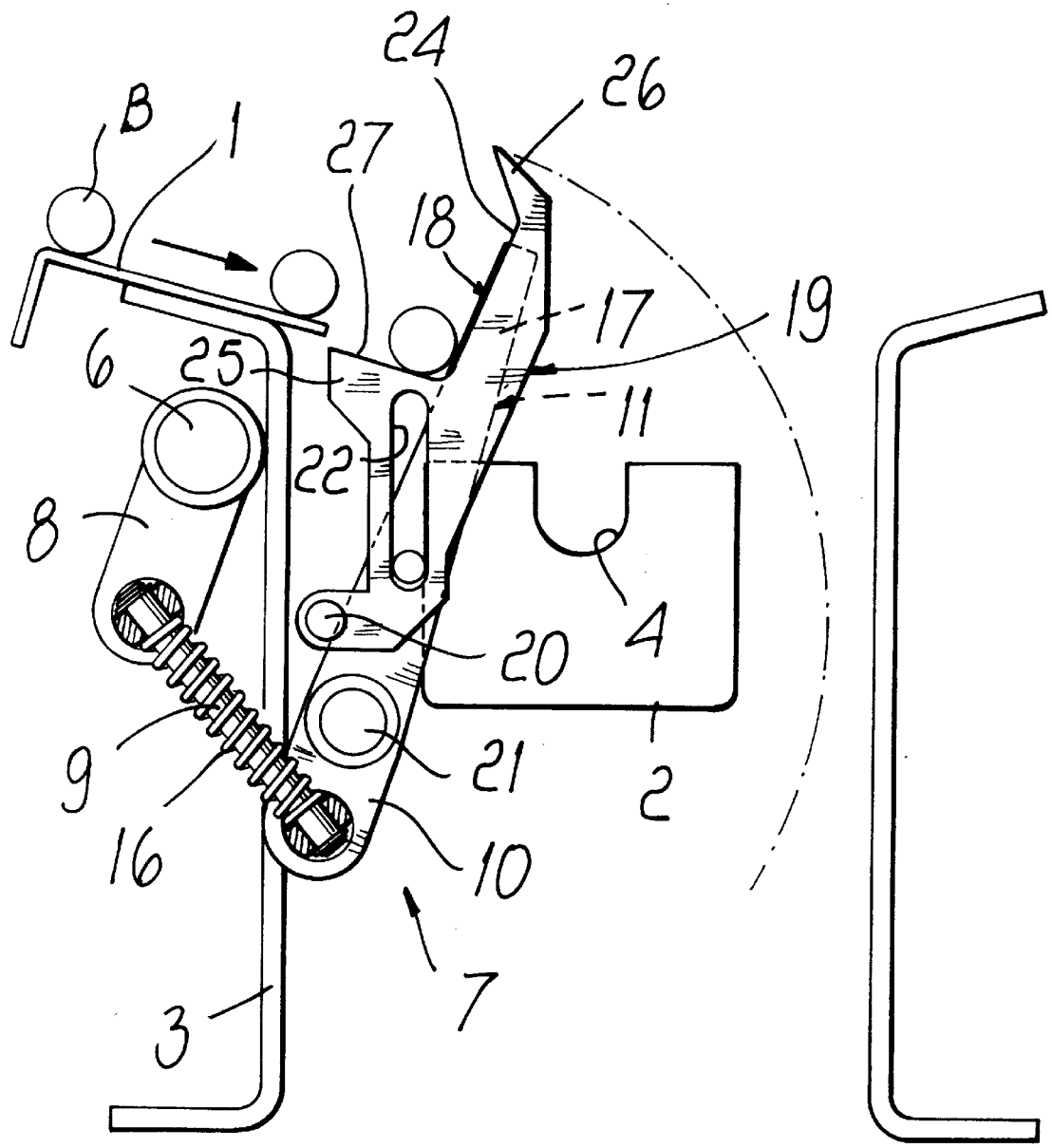
FIGS. 3 and 4 are two views, similar to the preceding ones, in the case of the transfer of a small-diameter bar.
Figure 4:
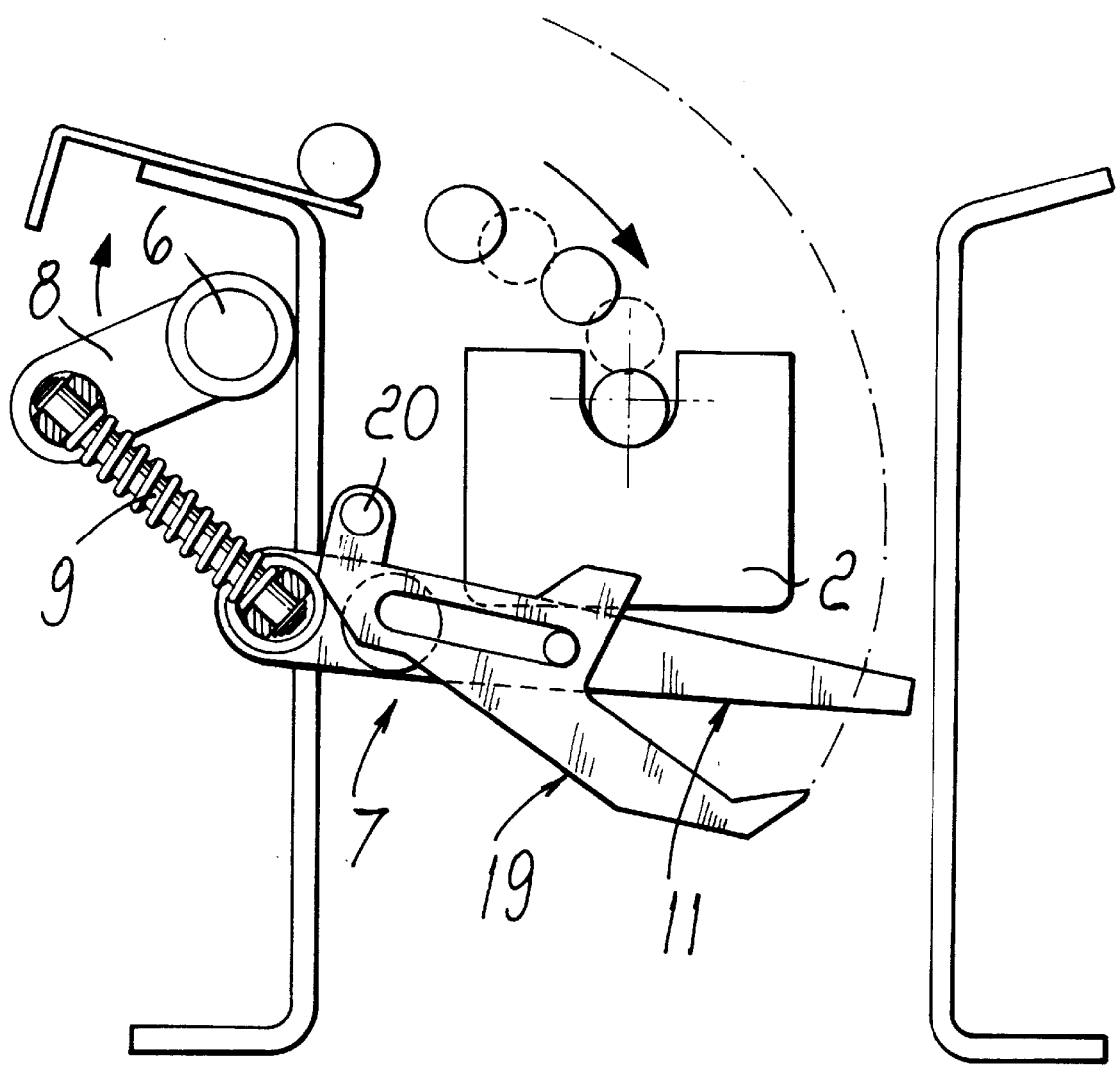

With reference to FIGS. 1, 3 and 4, the reference numeral 1 designates a chute which constitutes a supporting and feeding surface for the bar that must be inserted in the guide 2 of a bar feeder.

The chute 1 is fixed to a longitudinal beam 3 of the feeder at a higher level than the guide 2.

The guide 2 is constituted by a U-shaped element which lies longitudinally and forms a guiding channel 4 open upwards and which, during the machining of the bar, is closed by a cover 5, which is shown only schematically in FIG. 1.

A rod 6 is rotatably supported below the chute 1, is parallel to the guide 2, and is connected to a motorization system so as to produce the oscillation of a plurality of elements 7 distributed along the guide 2 to the side thereof.

The elements 7, only one of which is shown in the figures, are composed of an arm 8 fixed radially to the rod 6 and articulately connected to the end of a stem 9 which acts as a linkage, the stem 9 being further connected, by virtue of its opposite end, to the arm 10 of a lever 11 which is pivoted in a rocker-like manner at the longitudinal beam 3. The arms 8 and 10 and the stem 9 thus form a linkage system, located under the inclined bar supporting surface, i.e. the chute 1, for linking the lever 11 through the motorization rod 6 to the motorization system.

The articulations of the stem 9 in the arms 8 and 10 are constituted by pivots 12 and 13 which are diametrically crossed by the opposite ends of the stem 9 and can rotate in the respective arms about axes which are parallel to the rod 6. The stem 9 is coupled to the pivots 12 and 13 by rings 14 and 15 which are mounted at the ends of the stem 9 and against which the pivots are pushed by a spring 16 which is superimposed on the stem portion that lies between the pivots.

Accordingly, the couplings between the pivots 12 and 13 and the stem 9 are of an elastic type and allow a certain freedom of movement of the lever 11 with respect to the arm 8.

The lever 11, which owing to its function is termed bar abutment and follower lever, has a second arm 17 whose length is such that it protrudes, in a substantially upright angular position of the lever 11, above the extension of the chute 1.

The lever 11, under the actuation of the rod 6 and by means of the linkage system 8-10, performs oscillations by virtue of which the arm 17 can rotate from the substantially upright position shown in FIG. 1 until it reaches a substantially horizontal position below the guide 2. The upright position is the one in which the arm 11, with its front edge 18, acts as abutment for a bar B which descends from the chute 1, while the horizontal position is the one in which the bar B is deposited into the channel 4 of the guide 2.

A second lever, generally designated by the reference numeral 19 and hereinafter referenced as bar supporting lever, is operatively associated with the lever 11 and is adjacent thereto.

The supporting lever 19 is articulated to the beam 3 about an axis 20 which lies above the articulation axis 21 of the abutment lever 11.

Figure 5:
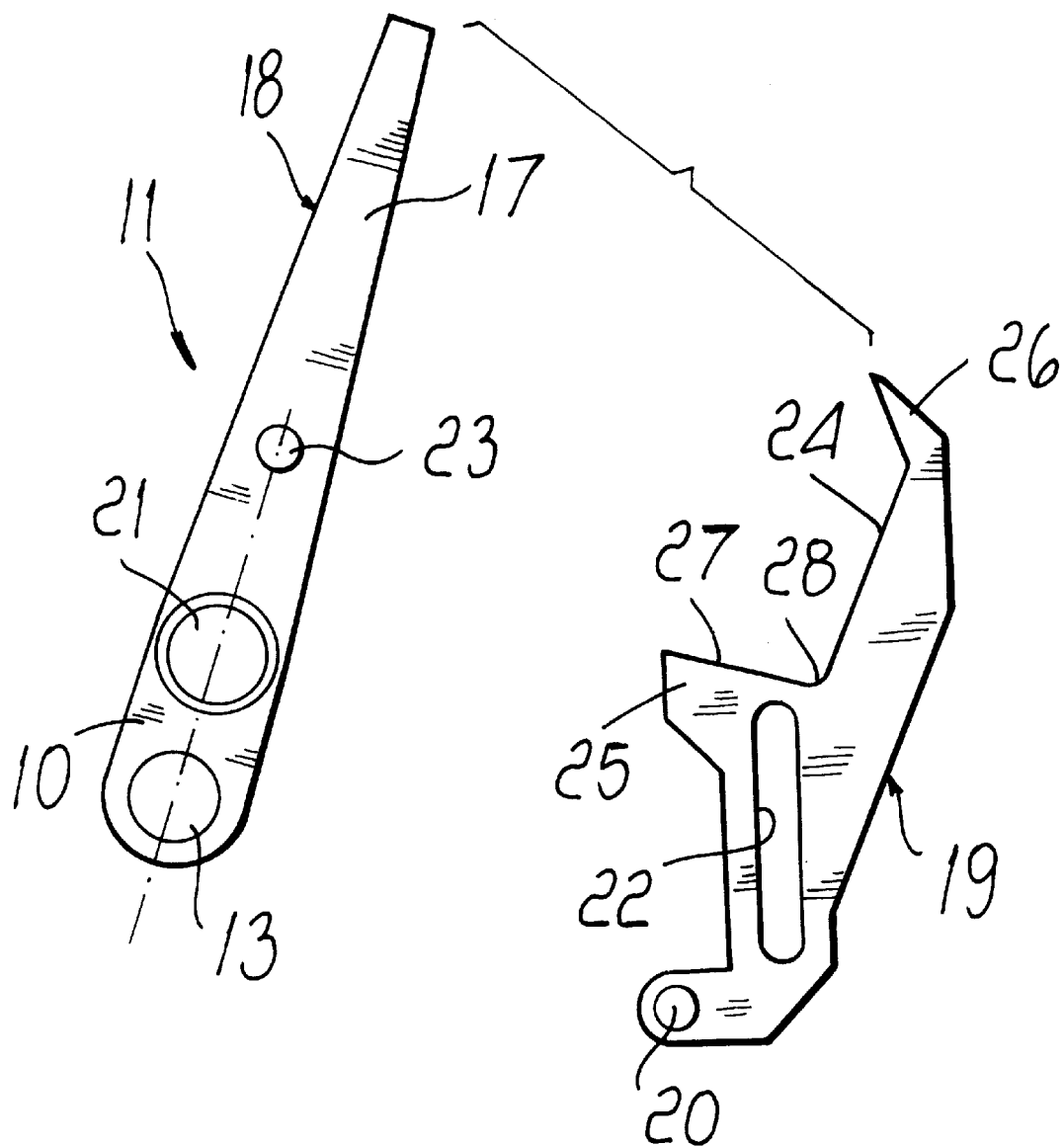
FIG. 5 is an exploded view of the two levers of the device.

As shown more clearly by FIG. 5, the lever 19 comprises a slot 22 in which a pin 23 is engaged which protrudes laterally from the arm 17 of the lever 11. The slot 22 and the pivot 23 form a slot link which allows the lever 19 to perform angular strokes which are different from those of the lever 11 with which it is associated. In practice, when the lever 11 is in the upright position for abutment against the bar B that arrives from the chute 1, the lever 19 has a front edge 24 which is co-planar with respect to the front edge 18 of the lever 11. On the other hand, when the lever 11 has reached a substantially horizontal position, the front edge 24 of the lever 19 has descended below the front edge 18 of the lever 11. Eventually, each one of the plurality of oscillating elements 7 may be deemed to comprise a linkage system 8-10, a first lever 11 and also a second lever 19, the two levers 11, 19 being, as explained, operatively interconnected and articulated to the arm 10 of the linkage system 8-10.

A central expansion 25 and a tip expansion 26 protrude from the front edge 24 of the lever 19. The central expansion 25 has a straight edge 27 which forms a V-shaped slot 28 together with the front edge 24. The edge 27 forms, with respect to the edge 24, such an angle that when the lever 19 is in the upright position the edge 27 is parallel to the chute 1. The tip expansion 26 is meant to retain the bar, preventing it from leaving the front edge 18 and 24 of the levers 11 and 19.

The operation of the described device is as follows.

In the initial position, the two levers 11 and 19 are arranged in an upright position, so that their front edges 18 and 24 are co-planar.

Figure 2:
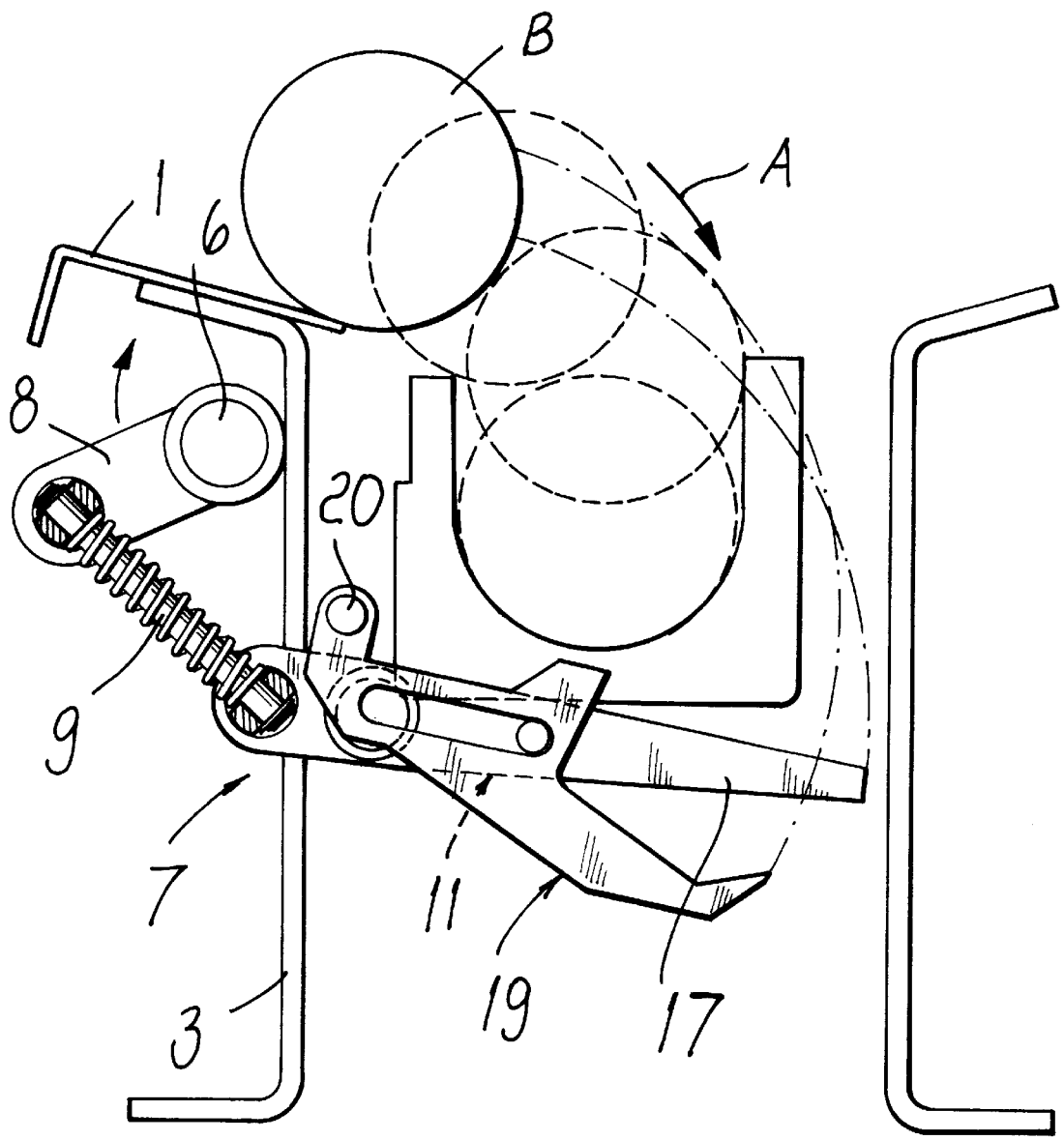
FIG. 2 is a view of the device of FIG. 1 in a subsequent operating position.

If the bar B to be inserted in the channel 4 of the guide 2 has a large diameter, one has the situation shown in FIGS. 1 and 2, wherein the bar B that descends from the chute 1 rests against the expansion 26 and, as soon as the levers 11 and 19 begin their rotation, is arranged in the slot 28. It should be noted that any impact of the bar against the levers 11 and 19 is cushioned by the springs 16.

By imparting to the elements 7 an oscillation in the direction A by actuating the rod 6, the lever 19, by means of the slot link 22 and 23, surpasses the lever 11, so that the bar B remains in abutment against the front edge 18 of the lever 11 and rests on the edge 27 of the expansion 25 of the lever 19. In practice, the bar B follows a path which is substantially shaped like an arc and allows it to enter the channel 4 of the guide 2 and be accompanied by the lever 11 until it touches the bottom of said channel.

If the bar B has a very small diameter, so that the guiding channel 4 is further away with respect to the chute 1, as shown in dashed lines in FIGS. 1 and 2 and in solid lines in FIGS. 3 and 4, the slot link 22 and 23 allows to support the bar along a longer curved path. This is allowed by the fact the once the lever 19 has surpassed the arm 17, the slot 28 is formed by the edges 18 and 27 and, by virtue of the rotation of the lever 19 with respect to the lever 11, moves toward the end of the edge 27.

It should be noted that in any case the last portion of the transfer path covered by the bar has a substantially steeper inclination which allows more reliable entry into the guiding channel. It is particularly advantageous that the bar continues to be supported by the lever 11 until it is deposited in the channel 4. This, in addition to avoiding stresses which can be critical for the structure of the feeder, produces a considerable reduction in the noise level, which is particularly high in conventional machines since the fall of the bar into the guide is not followed in any way.

In practice, the materials employed, so long as they are compatible with the specific use, as well as the dimensions, may be any according to requirements and to the state of the art.

The disclosures in Italian Patent Application No. BO97A000548 from which this application claims priority are incorporated herein by reference.

What is claimed is:

1. A device for transferring a bar from an inclined supporting surface onto an underlying channel of a guide of a bar feeder, the device including:
   a motorization system comprising a motorization rod; and
   a plurality of oscillating elements actuated by said motorization system for oscillating between a bar receiving position located at said supporting surface in which a bar arriving from said supporting surface is received in abutment and a bar deposition position in which the bar is deposited at a bottom part of the channel of the feeder guide;
   and wherein said oscillating elements each comprise:
      a bar abutment lever having an abutment edge for receiving in abutment and accompanying said bar during transfer movement thereof from said supporting surface to said underlying channel;
      a bar supporting lever having a central expansion constituting a supporting edge for supporting the bar during the transfer movement thereof, a front edge with a tip expansion protruding therefrom for retaining the bar arriving from the supporting surface, with said supporting edge and said front edge with the tip expansion thereof forming a bar transferring slot for accommodating and respectively transferring, along a path extending from a bar receiving position to a bar deposition position, the bar arrived from the supporting surface; and
      a linkage system, mounted under said supporting surface, for linking said bar supporting and abutment levers to said motorization system,
      wherein said linkage system comprises: a radial arm connected to said motorization rod; a first arm connected to said abutment lever; a stem, said first arm being further connected at a free end thereof, by way of said stem, to said radial arm, said motorization rod being actuatable to produce oscillation of said oscillating elements; and articulation pivots for articulating said stem to said first and radial arms respectively; and
      wherein said bar supporting lever and said abutment lever are operatively interconnected by way of a slot link and are further articulated to said linkage system so as to be oscillatable both together and with respect to each other through preset rotation angles, said rotation angles being such as to determine movement of said bar transferring slot with said bar accommodated therein along said path, with said supporting lever oscillating through a greater rotation angle than the rotation angle of the abutment lever.

2. The device of claim 1, further comprising elastic cushioning means for cushioning impacts caused by bars arriving, from said supporting surface, in abutment against said abutment and supporting levers, said cushioning means comprising:
   end rings being rigidly respectively coupled to opposite ends of said stem; and
   a compression spring which is superimposed on a portion of said stem that lies between said articulation pivots so as to push said pivots against said rings;
   said ends of said stem crossing diametrically said articulation pivots which are slidingly movable along the stem between said rings, whereby said spring elastically contracts upon said articulation pivots sliding closer to each other, due to said bar impacts.

3. The device of claim 1, wherein said abutment lever has a second arm connected to said first arm, said second arm including said abutment edge and having such a length so as to oscillate between said bar receiving position and said bar deposition position while accompanying said bar during transfer movement thereof.

4. The device of claim 3, wherein said supporting lever and said abutment lever are articulated about respective axes to the bar feeder, with the axis of said supporting lever lying above the articulation axis of said abutment lever and wherein the supporting lever comprises a guiding slot, and the abutment lever comprises a pivot protruding laterally therefrom to engage into said slot, said guiding slot and said pivot forming said slot link which allows said supporting lever to perform different angular strokes with respect to the abutment lever, such that when the abutment lever is in the position for abutting against a bar arriving from said inclined supporting surface, the supporting lever has the front edge thereof arranged coplanar to said abutment edge of said abutment lever and said supporting edge is parallel to said inclined supporting surface, and when the abutment lever is in a position below the channel of said guide after transferring a bar, the front edge of the supporting lever is located below said abutment edge of the abutment lever.

5. In a device for transferring a bar from an inclined supporting surface into an underlying channel of a guide of a bar feeder, the device including a motorization rod, a plurality of oscillating elements mounted for actuation on said rod, each of said oscillating elements comprising:

a bar abutment lever having an abutment edge for receiving in abutment and accompanying said bar during transfer movement thereof from said supporting surface to said underlying channel;

a bar supporting lever having a central expansion constituting a supporting edge for supporting the bar during the transfer movement thereof, a front edge with a tip expansion protruding therefrom for retaining the bar arriving from the supporting surface, with said supporting edge and said front edge with the tip expansion thereof forming a bar transferring slot for accommodating and respectively transferring, along a path extending from a bar receiving position to a bar deposition position, the bar arrived from the supporting surface; and a linkage system including a radial arm connected to said motorization rod, a first arm connected to said abutment lever, a stem, said first arm being further connected at a free end thereof, by way of said stem, to said radial arm, and articulation pivots for articulating said stem to said first and radial arms respectively; and wherein said bar supporting lever and said abutment lever are operatively interconnected by way of a slot link and are further articulated to said linkage system so as to be oscillatable both together and with respect to each other through preset rotation angles, said rotation angles being such as to determine movement of said bar transferring slot with said bar accommodated therein along said path, with said supporting lever oscillating through a greater rotation angle than the rotation angle of the abutment lever.

6. The element of claim 5, further comprising elastic cushioning means for cushioning impacts caused by bars arriving, from said supporting surface, in abutment, against said abutment and supporting levers, said cushioning means comprising:

end rings being rigidly respectively coupled to opposite ends of said stem; and a compression spring which is superimposed on a portion of said stem that lies between said articulation pivots so as to push said pivots against said rings;

said ends of said stem crossing diametrically said articulation pivots which are slidingly movable along the stem between said rings, whereby said spring elastically contracts upon said articulation pivots sliding closer to each other, due to said bar impacts.

7. The element of claim 6, wherein said abutment lever has a second arm connected to said first arm, said second arm including said abutment edge and having such a length so as to oscillate between said bar receiving position and said bar deposition position while accompanying said bar during transfer movement thereof.

8. The element of claim 6, wherein said supporting lever and said abutment lever are articulated about respective axes to the bar feeder, with the axis of said supporting lever lying above the articulation axis of said abutment lever and wherein the supporting lever comprises a guiding slot, and the abutment lever comprises a pivot protruding laterally therefrom to engage into said slot, said guiding slot and said pivot forming said slot link which allows said supporting lever to perform different angular strokes with respect to the abutment lever, such that when the abutment lever is in the position for abutting against a bar arriving from said inclined supporting surface, the supporting lever has the front edge thereof arranged coplanar to said abutment edge of said abutment lever and said supporting edge is parallel to said inclined supporting surface, and when the abutment lever is in a position below the channel of said guide after transferring a bar, the front edge of the supporting lever is located below said abutment edge of the abutment lever.

9. In a device for transferring a bar from an inclined supporting surface into an underlying channel of a guide of a bar feeder, the device including a motorization rod, a plurality of oscillating elements mounted for actuation on said rod, each of said oscillating elements comprising:

a linkage system;

a bar abutment lever having an abutment edge for receiving in abutment a bar arriving from said supporting surface and accompanying the bar during transfer movement thereof from said supporting surface to said underlying channel;

a bar supporting lever having a central expansion constituting a supporting edge for supporting the bar during the transfer movement thereof, a front edge with a tip expansion protruding therefrom for retaining the bar arriving from the supporting surface, with said supporting edge and said front edge with the tip expansion thereof forming a bar transferring slot for accommodating and respectively transferring, along a path extending from a bar receiving position to a bar deposition position, the bar arrived from the supporting surface;

and wherein said bar supporting lever and said abutment lever are operatively interconnected by way of a slot link and are further articulated to said linkage system so as to be oscillatable both together and with respect to each other through preset rotation angles, said rotation angles being such as to determine movement of said bar transferring slot with the bar accommodated therein along said path;

elastic cushioning means, interposed in said linkage system, for cushioning any impact caused by the bar arriving from said supporting surface, in abutment, against said abutment and supporting levers; and said linkage system including a radial arm connected to said motorization rod, a first arm connected to said abutment lever, a stem, said first arm being further connected at a free end thereof, by way of said stem, to said radial arm, and articulation pivots for articulating said stem to said first and radial arms respectively.

10. The element of claim 9, wherein said cushioning means comprise:

end rings being rigidly respectively coupled to opposite ends of said stem; and a compression spring which is superimposed on a portion of said stem that lies between said articulation pivots so as to push said pivots against said rings;

said ends of said stem crossing diametrically said articulation pivots which are slidingly movable along the stem between said rings, whereby said spring elastically contracting upon said articulation pivots sliding closer to each other, due to said bar impacts.

11. The element of claim 10, wherein said abutment lever has a second arm connected to said first arm, said second arm including said abutment edge and having such a length so as to oscillate between said bar receiving position and said bar deposition position while accompanying said bar during transfer movement thereof.

12. The element of claim 11, wherein said supporting lever and said abutment lever are articulated about respective axes to the bar feeder, with the axis of said supporting lever lying above the articulation axis of said abutment lever and wherein the supporting lever comprises a guiding slot, and the abutment lever comprises a pivot protruding laterally therefrom to engage into said slot, said guiding slot and said pivot forming said slot link which allows said supporting lever to perform different angular strokes with respect to the abutment lever, such that when the abutment lever is in the position for abutting against a bar arriving from said inclined supporting surface, the supporting lever has the front edge thereof arranged coplanar to said abutment edge of said abutment lever and said supporting edge is parallel to said inclined supporting surface, and when the abutment lever is in a position below the channel of said guide after transferring a bar, the front edge of the supporting lever is located below said abutment edge of the abutment lever.

* * * * *